(12) United States Patent
Poux et al.

(10) Patent No.: US 9,309,009 B1
(45) Date of Patent: Apr. 12, 2016

(54) INTERACTIVE DIAGNOSTIC DISPLAY SYSTEM AND METHOD FOR AN AIRCRAFT

(71) Applicant: AIRBUS OPERATIONS SAS, Toulouse (FR)

(72) Inventors: Thibaut T. Poux, Toulouse (FR); Sebastien S. Giuliano, Leguevin (FR); Clement Larrieu, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 14/575,047

(22) Filed: Dec. 18, 2014

(51) Int. Cl.
*G01M 17/00* (2006.01)
*B64F 5/00* (2006.01)
*G07C 5/08* (2006.01)

(52) U.S. Cl.
CPC ............ *B64F 5/0045* (2013.01); *G07C 5/0808* (2013.01); *G07C 5/0825* (2013.01)

(58) Field of Classification Search
CPC  B64C 13/00; B64C 13/20; B64D 2045/0035; B64D 2043/0055; G07C 5/0825; G07C 5/0808
USPC ......... 701/1, 2, 16, 29.1, 36; 244/175 R, 189; 340/961, 435, 438
See application file for complete search history.

(56) References Cited

U.S. PATENT DOCUMENTS

| 2003/0093187 | A1* | 5/2003 | Walker | B64C 13/20 701/1 |
| 2005/0187677 | A1* | 8/2005 | Walker | B64C 13/20 701/16 |
| 2013/0197721 | A1* | 8/2013 | Gu | B64D 45/00 701/3 |

* cited by examiner

*Primary Examiner* — Gertrude Arthur Jeanglaud
(74) *Attorney, Agent, or Firm* — Greer, Burns & Crain, Ltd.

(57) ABSTRACT

A diagnostic display system is provided for diagnosing avionics components of an aircraft using an interactive display accessible to a user in real time. A central diagnostic module receives at least one signal from a plurality of sensors for the aircraft, and at least one parameter from a related avionics system associated with the aircraft. A component information module provides operational status information about at least one of the avionics components of the aircraft, and provides a detailed operational status configuration of each avionics component using a plurality of status messages stored in a database via a network. The central diagnostic module assesses a current operational status of the aircraft by evaluating the operational status configuration illustrated in the display for establishing a visual link between the status messages associated with the avionics components of the aircraft.

20 Claims, 8 Drawing Sheets

Fig. 3

AIRCRAFT GLOBAL STATUS — LAND ASAP — REDUND ○

ALL PHASES

FLY
MAX SPEED, 510 KT
FLAP RETRACTN INHIBD
NO L/G RETRACTION
MAX FL 150/MEA,MORA
AVOID NEGG LOAD
SPD ERC, DO NOT USE
ALTN LAW, PROT LOST
A/THR
F/CTL PROT

NAV
AVOID ICING COND
FUEL CONSUMPT INCRSD
FUEL PARTLY UNUSABLE
FMS PRED UNRELIABLE WITHOUT ACCURATE
IMS FUEL PENALTY INSERTION
APPR 1 ONLY
FOR RNP AR, MINIMUM LIMITED TO RNP 0.30
GPWS

COM

APPR & LDG

FLY
LDS DIST AFFECTED
GA THR TOGA ONLY
LDG FIRE AFFECTED
IF SEVERE ICE, FLAPS
FOR LDG : FLAP LVR 5
FOR GA KEEP S/F CONF
L/G GRVTY EXTN ONLY
FLAPS SLOW
DELAY BRAKING UNTIL NLG TOUCHDOWN
NO BRAKED PIVOT TURN
TAXI WITH CARE
BRK PRESS AUTO LIMITED ON FWD WHEELS
AT LDG IF ACCU PRESS BELOW 5400 PSI
BRK PRESS AUTO LIMITED ON AFT WHEELS
ON ACCU. BRK AS RQRD WITHOUT RELEASING
AT LDG IF ACCU PRESS BELOW 1600 PSI,
GA SOFT
BTV
AUTO BRK
PART A-SKID
PART NORM BRK

NAV
LAND & SINGLE ONLY
AUTOLAND

DEFERRED PROC
L/G GRVTE EXIN
WHEN G SYS TEMP HI OUT

[DOORS] [AIR] [BLEED] [ENG] [WHEELS] [A-ICE] [HYD] [FUEL] [F/CTL] [FIRE&SMK] [ELEC] [APU]

FOR 191517 KG — GW 254519 KG — GWCG 12.4 %

— 36
— 38
— 10

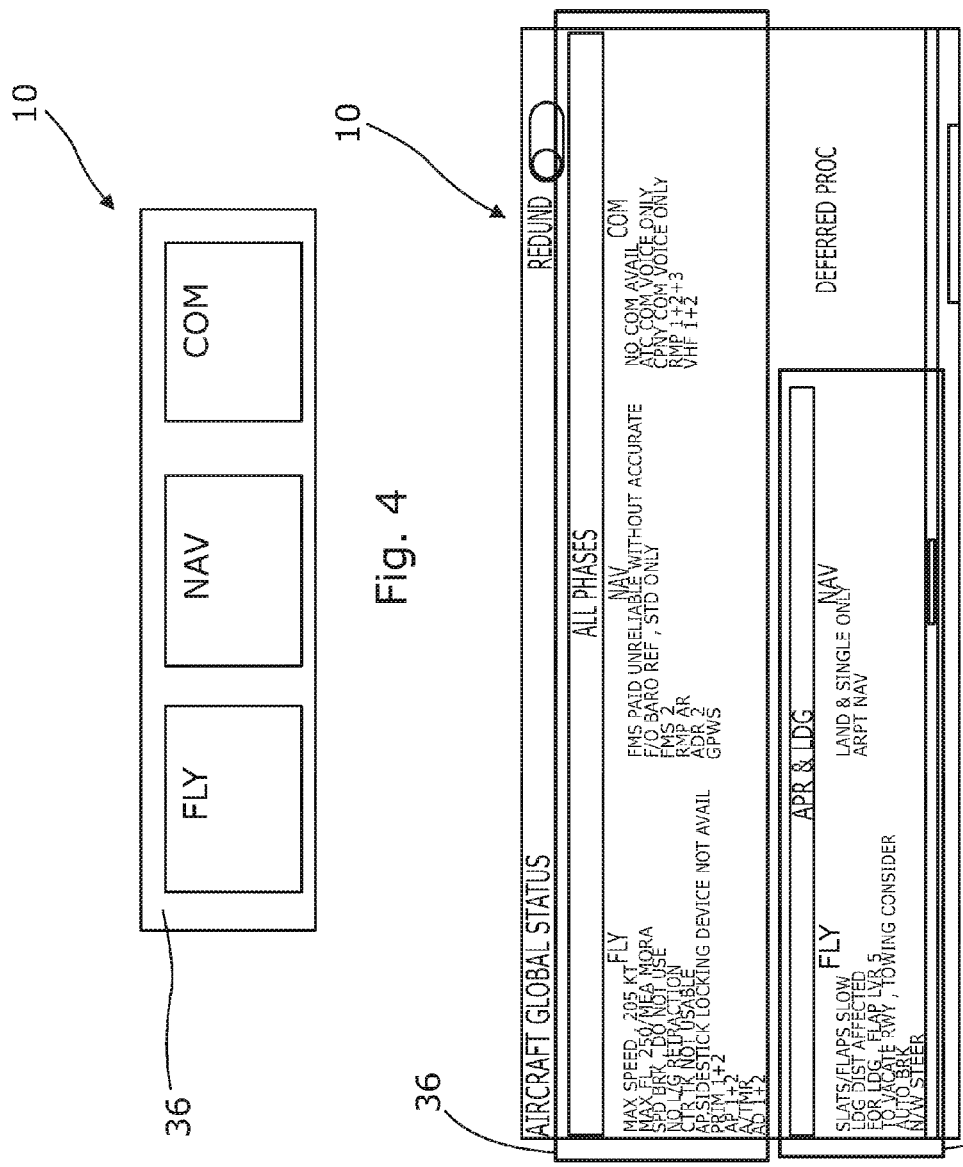

INTERACTIVE DIAGNOSTIC DISPLAY SYSTEM AND METHOD FOR AN AIRCRAFT

FIELD OF THE INVENTION

The present invention generally relates to aircraft display systems, and in particular relates to a diagnostic system for operation of an aircraft using an interactive display device.

BACKGROUND OF THE INVENTION

Troubleshooting and maintenance of avionics equipment in an aircraft are important tasks for proper operation of the aircraft during flight and taxiing. Even the most sophisticated and complex diagnostic systems must be regularly reviewed by flight crew and pilots for recovering potential faults of the avionics equipment. Most electronic instrument systems used in the aircraft receive signals and parameters from various sensors, and display the signals and parameters on one or more single or multicolor display units on an instrument panel. The diagnostic system evaluates changes in the signals and parameters based on programmed thresholds, and warns the flight crew of any changes that could signal impending technical issues. Typically, any of the sensed signals and parameters are automatically displayed when the signals and parameters fall outside of their allowable range of operation.

Typically, during preparation for taxiing, take-off, cruise or landing, the pilot performs many diagnostic tasks. The pilot determines an accurate navigational course of the aircraft by examining current conditions of the avionic systems. Then, the pilot prepares the aircraft for optimizing the operation of the aircraft according to Air Traffic Control (ATC) constraints. As a result, the workloads of the pilot and flight crew become significant and convoluted during operation. Thus, it is important to perform prompt and effective examination of the avionics equipment, and confirm that the avionics equipment is operating smoothly without any interruptions and delays, or that the operational impact of any avionics equipment failure is promptly and clearly understood.

A conventional configuration of the display unit renders the links between these signals and parameters not readily recognizable, and creates confusion and misunderstanding prone to improper or ill-timed adjustments of the avionics equipment during operation leading to unnecessary workload. As an example only, it may be unclear whether a sudden change in a fuel consumption rate influences a navigation ability of the aircraft during take-off or landing. In some cases, the pilot may have to spend a relatively considerable amount of time evaluating information gleaned from the signals and parameters before initiating corrective actions.

Further, various equipment fault information is observed and considered independently in an isolated manner, separately from other related fault information that may also need to be reviewed simultaneously. It takes time for the pilot to gather all relevant information and determine the effective course of action for correcting the detected faults of the aircraft. The conventional configuration does not always effectively and promptly provide an actual or potential root cause or location of the trouble when the fault is detected by the diagnostic system.

Therefore, there is a need for developing an improved diagnostic display system and method such that the diagnostic display system facilitates an accurate depiction of faults root cause as well as impacts on aircraft abilities, thereby easing correction of the faults for sustaining reliable navigation and control of the aircraft.

SUMMARY OF THE INVENTION

Advantages are achieved by the present diagnostic display system which includes an improved aircraft status message database for storing specific information relating to operational relationships between avionics components of the aircraft in a suitable dimensional coordinate system. The present diagnostic display system further includes a computer processor coupled to databases and programmed to perform tasks and display relational information of the avionics components. Included in the present status message database is a status description of each component, and is designed to take up minimal space in memory such that it can be readily embedded in different applications in the aircraft.

As discussed in greater detail below, the present diagnostic display system provides an enhanced diagnostic function for avionics operations using various signals and parameters received from aircraft sensors and other related systems. In a preferred embodiment, it is contemplated that a system and method is provided for processing multiple sources of data for diagnosing avionics components of the aircraft using the status message database. Also included in the present diagnostic display system is that a system and method configured for correlating various sources of avionics components based on operational relationships between the avionics components. Further, the present diagnostic display system provides enhanced displays and relations of the avionics components related to the aircraft in real time.

The present diagnostic display system automatically generates a relationship link or bond between the avionics systems for the aircraft based on the information stored in the status message database. As a result, the pilots clearly understand the causes and consequences of the fault and can perform a prompt and efficient corrective course of action while the aircraft is operated. Thus, the present diagnostic display system provides a reliable means of assisting in the operation of the aircraft without causing delays in the fault treatment.

In one embodiment, a diagnostic display system is provided for diagnosing avionics components of an aircraft using an interactive display accessible to a user in real time. A central diagnostic module receives at least one signal from a plurality of sensors for the aircraft, and at least one parameter from a related avionics system associated with the aircraft. A component information module provides operational status information about at least one of the avionics components of the aircraft, and provides a detailed operational status configuration of each avionics component using a plurality of status messages stored in a database via a network. The central diagnostic module assesses a current operational status of the aircraft by evaluating the operational status configuration illustrated in the display for establishing a visual link between the status messages associated with the avionics components of the aircraft.

In another embodiment, a computer-implemented method is provided for diagnosing avionics components of an aircraft using an interactive display accessible to a user in real time. Included in the method are receiving at least one signal from a plurality of sensors for the aircraft, and at least one parameter from a related avionics system associated with the aircraft; providing operational status information about at least one of the avionics components of the aircraft; providing a detailed operational status configuration of each avionics component using a plurality of status messages stored in a database via a network; assessing a current operational status of the aircraft by evaluating the operational status configuration illustrated in the display; and establishing a visual link between the plurality of status messages associated with the avionics components of the aircraft.

The foregoing and other aspects and features of the invention will become apparent to those of reasonable skill in the art from the following detailed description, as considered in conjunction with the accompanying drawings.

BRIEF DESCRIPTION OF THE DRAWINGS

FIG. 3 illustrates an exemplary visualization of a status message display presented by the present diagnostic display system;

FIG. 4 illustrates an exemplary visualization of operational levels categorized by the present diagnostic display system;

FIG. 5 illustrates an exemplary visualization of the status message display, featuring parent and subordinate status messages categorized by the present diagnostic display system;

DETAILED DESCRIPTION OF THE PREFERRED EMBODIMENTS

Preferred embodiments of the present invention are described below by way of example only, with reference to the accompanying drawings. Further, the following description is merely exemplary in nature and is in no way intended to limit the invention, its application, or uses. As used herein, the term "module" or "unit" may refer to, be part of, or include an Application Specific Integrated Circuit (ASIC), an electronic circuit, a processor (shared, dedicated, or group) and/or memory (shared, dedicated, or group) that executes one or more software or firmware programs, a combinational logic circuit, and/or other suitable components that provide the described functionality. Thus, while this invention includes particular examples and arrangements of the modules, the scope of the present system should not be so limited since other modifications will become apparent to the skilled practitioner.

Figure 1:
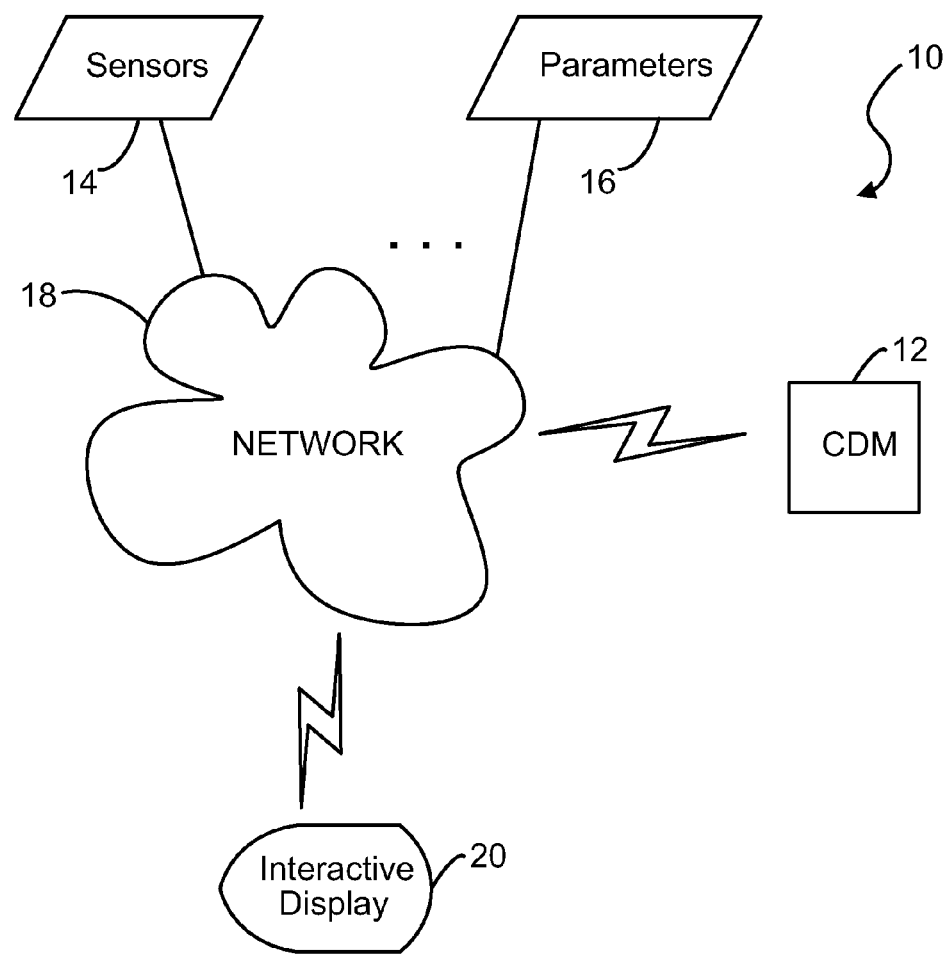
FIG. 1 illustrates an exemplary visualization of the present diagnostic display system having a central diagnostic module.

Referring now to FIG. 1, the present diagnostic display system is generally designated 10, and is designed to provide an efficient way to diagnose avionics components of an aircraft, and also to provide enhanced displays and relations of the avionics components related to the aircraft in real time. Included in the present system 10 is a central diagnostic module or unit (CDM) 12, which regulates an overall operation of the present system. In general, the CDM 12 receives at least one signal from a plurality of sensors 14 for the aircraft, and at least one parameter 16 from other related avionics systems associated with the aircraft.

Specifically, the CDM 12 receives the signals and parameters via a network 18, and displays related diagnostic information on an interactive display 20 accessible to the pilot. Any type of computer network having a collection of computers, servers, and other hardware interconnected by communication channels is contemplated, such as the Internet, Ethernet, LAN, etc. In a preferred embodiment, the CDM 12 interfaces with the network 18, such as a wireless communication facility (e.g., a Wifi access point), and performs a point of care diagnostic test for detecting and qualifying the operational status of the aircraft.

The CDM 12 manages interactions between flight crew members and the present system 10 by way of a human machine interface (HMI), such as a keyboard, a touch sensitive pad or screen, a mouse, a trackball, a voice recognition system, and the like. The interactive display 20 (e.g., textual and graphical) is configured for receiving an input signal from the crew and/or the CDM 12. In one embodiment, the crew uses an input device, such as the HMI, to graphically or textually interact with the present system 10. The signals and/or parameters are generally received in the CDM 12 and then transferred to the display device 20 via a dedicated communication system. A dedicated airline datalink can be used for an aircraft diagnostic service. Further, any collaborative other and third-party database reachable by the aircraft can also be used for the diagnostic service.

Figure 2:
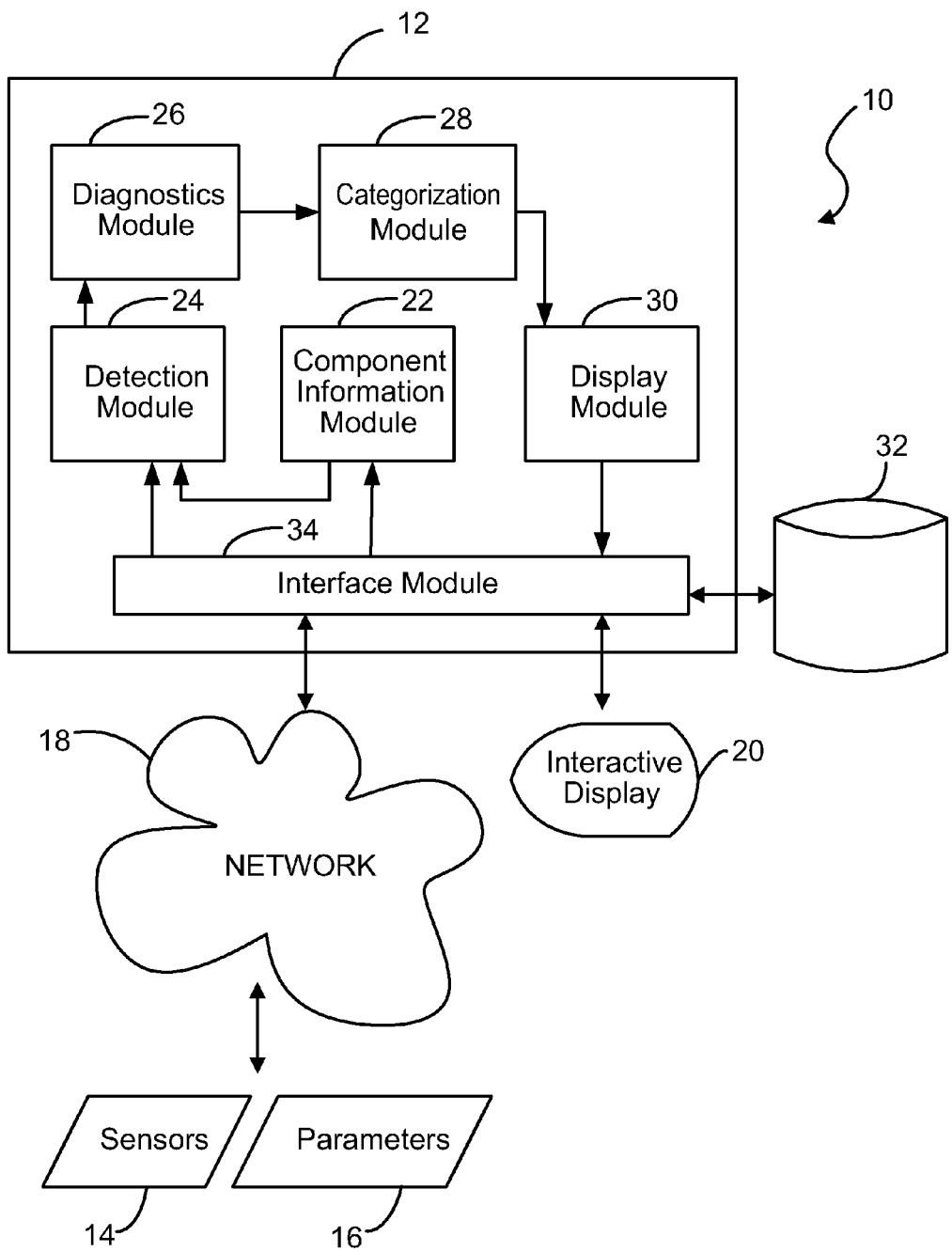
FIG. 2 is a functional block diagram of the present diagnostic display system, featuring children modules of the central diagnostic module of FIG. 1.

Referring now to FIGS. 2 and 3, it is preferred that the system 10 includes the CDM 12 having a component information module 22, a detection module 24, a diagnostics module 26, a categorization module 28, and a display module 30. Although the sub-modules 22, 24, 26, 28, 30 are illustrated as children modules subordinate of the parent module CDM 12, each sub-module can be operated as a separate unit from the CDM, and other suitable combinations of sub-modules are contemplated to suit different applications.

All relevant information can be stored in a central database 32, e.g., as a data storage device and/or a machine readable data storage medium carrying computer programs, for retrieval by the CDM 12 and its children modules. Further, the CDM 12 includes an interface module 34 for providing an interface between the CDM 12, the central database 32, and the network 18. The interface module 34 controls operation of, for example, the sensors 14, the parameters 16, the network 18, and other related system devices, services, and applications. The other devices, services, and applications may include, but are not limited to, one or more software or hardware components, etc., related to the aircraft. The interface module 34 also receives the signals and/or parameters, which are communicated to the respective modules, such as the CDM 12, and its children modules 22, 24, 26, 28, 30.

The component information module 22 is configured to receive the signals and parameters via the interface module 34, and provide operational status information about at least one of the avionics components of the aircraft. Specifically, the component information module 22 provides detailed operational status breakdowns or configurations of each avionics component using a plurality of status messages stored in the database 32. The status messages are selectively displayed on the interactive display 20 in a predetermined order for providing the operational status information about the avionics components to the pilot and/or flight crew. In general, as discussed in greater detail below, the present system 10 assesses a current operational status of the aircraft by evaluating the current configuration textually and/or graphically illustrated in the display 20 for establishing a visual link or bond between the status messages associated with the avionics components of the aircraft.

As is the case with the component information module 22, the detection module 24 is also configured to receive the signals and parameters via the interface module 32, and examine the signals and parameters for detecting any faults or anomalies of the avionics components based on a predetermined set of rules. Optionally, the signals and parameters can be received from the component information module 22. In use, the detection module 24 monitors the operational status of the aircraft for a predetermined time period, and identifies a fault or anomaly of each avionics component based on an anomaly analysis in communication with the database 32. The detection module 24 retrieves all or a portion of the diagnostic service data associated with the aircraft from the database 32 for assisting in identifying the faults or anomalies of a current operational status of the aircraft.

The diagnostics module 26 is configured to analyze the detected faults or anomalies of the avionics components of the aircraft based on a set of predetermined thresholds or values. In a preferred embodiment, the diagnostics module 26 evaluates each detected fault or anomaly by applying a set of predetermined queries in response to erroneous operation of at least one of the avionics components as represented by the received signals and parameters. When the diagnostics module 26 determines that the detected fault or anomaly is out of an acceptable range based on the predetermined thresholds or values, the status messages associated with the avionics components are selected for illustration on the interactive display 20.

The categorization module 28 is configured to categorize the status messages based on a hierarchical level assigned to each status message. In a preferred embodiment, as shown in FIG. 3, the categorization module 28 divides the status messages into two distinct levels, namely an operational level (or phase) 36 and a functional level (or state) 38. For example, a status message associated with the current phase of flight is grouped in the operational level 36, and another status message associated with a future phase of the flight (e.g. an approach and landing phase) is grouped in the functional level 38.

As shown in FIG. 3, a global status of the aircraft is displayed using the status messages associated with the operational level 36 and the functional level 38. In a preferred embodiment, the categorization module 28 further divides the levels 36, 38 into one or more subcategories based on an operational connection of the avionics components. For example, the operational level ALL PHASES 36 is subdivided into three subcategories, namely a flight section FLY, a navigation section NAV, and a communication section COM. Similarly, the functional level 38 is subdivided into three subcategories, namely the flight section FLY, the navigation section NAV, and a deferred procedure section DEFERRED PROC. Other suitable subcategories are also contemplated.

The display module 30 is configured to illustrate the status messages based on at least one of the hierarchical level assigned to each status message and an operational relationship between the avionics components of the aircraft. Each section of the functional level 38 displays subordinate status messages related to a corresponding section of the parent operational level 36. Comprehensive illustrations of these two levels 36, 38 are described in greater detail below in paragraphs regarding FIGS. 4-8. Further, the CDM 12 can be integrated with the concept of a task scheduler disclosed in commonly assigned application Ser. No. 13/905,914 filed May 30, 2013, now a US Patent Pub. No. 2014/0200748, which is incorporated by reference in its entirety.

Referring now to FIGS. 4 and 5, it is preferred that the parent operational level 36 includes the status messages associated with all phases of the aircraft operation in at least one of the flight section FLY, the navigation section NAV, and the communication section COM. For example, the flight section FLY includes the status messages describing information regarding an aircraft trajectory or piloting, such as airspeed, braking, capacity of approach, and the like. The navigation section NAV includes the status messages describing information regarding aircraft limitations and capacities for navigation, such as fuel, precision of position, constraint parameters (e.g., time and space), zones to be avoided, and the like. The communication section COM includes the status messages describing information regarding technical limitations for the communication between a cockpit of the aircraft and external entities, such as restrictions on VHF or HF frequencies, aircraft datalink services, Air Operator's Certificate (AOC), aircraft cabin, and the like. Although three sections FLY, NAV, COM are shown for illustration purposes, other suitable sections and sub-sections are contemplated to suit different applications. Similarly, other suitable categorizations are also contemplated as desired.

As shown in FIG. 5, the child functional level 38 includes the status messages that are subordinate to the status messages of the corresponding parent operational level 36. For example, the child functional level 38 includes the status messages regarding the aircraft's approach and landing operation in at least one of the flight section FLY and the navigation section NAV. Each status message is evaluated by the categorization module 28 based on weighted severity such that if more than one status messages are similarly related in a same section, only more penalizing or severe status messages are retained and displayed in the functional level 38 based on the weighted severity. For example, only a predetermined number of status messages are displayed in each section of the child functional level 38 or the parent operational level 36 based on the corresponding weighted severity in a predetermined order. In one embodiment, the status messages are displayed using a distinct color scheme based on a message type (e.g., technical limitation in cyan, general information in green, and fault/anomaly in amber).

Figure 6A:
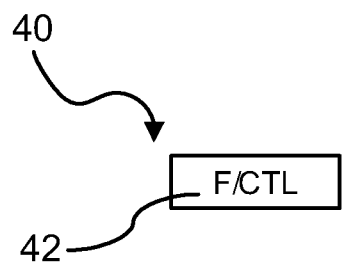
FIGS. 6A-6B illustrate an exemplary visualization of a tile system utilized by the present diagnostic display system for displaying subordinate messages.
Figure 6B:
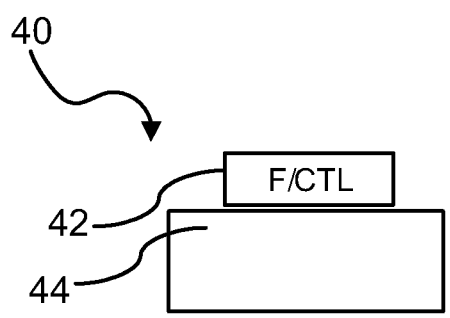
Figure 7:
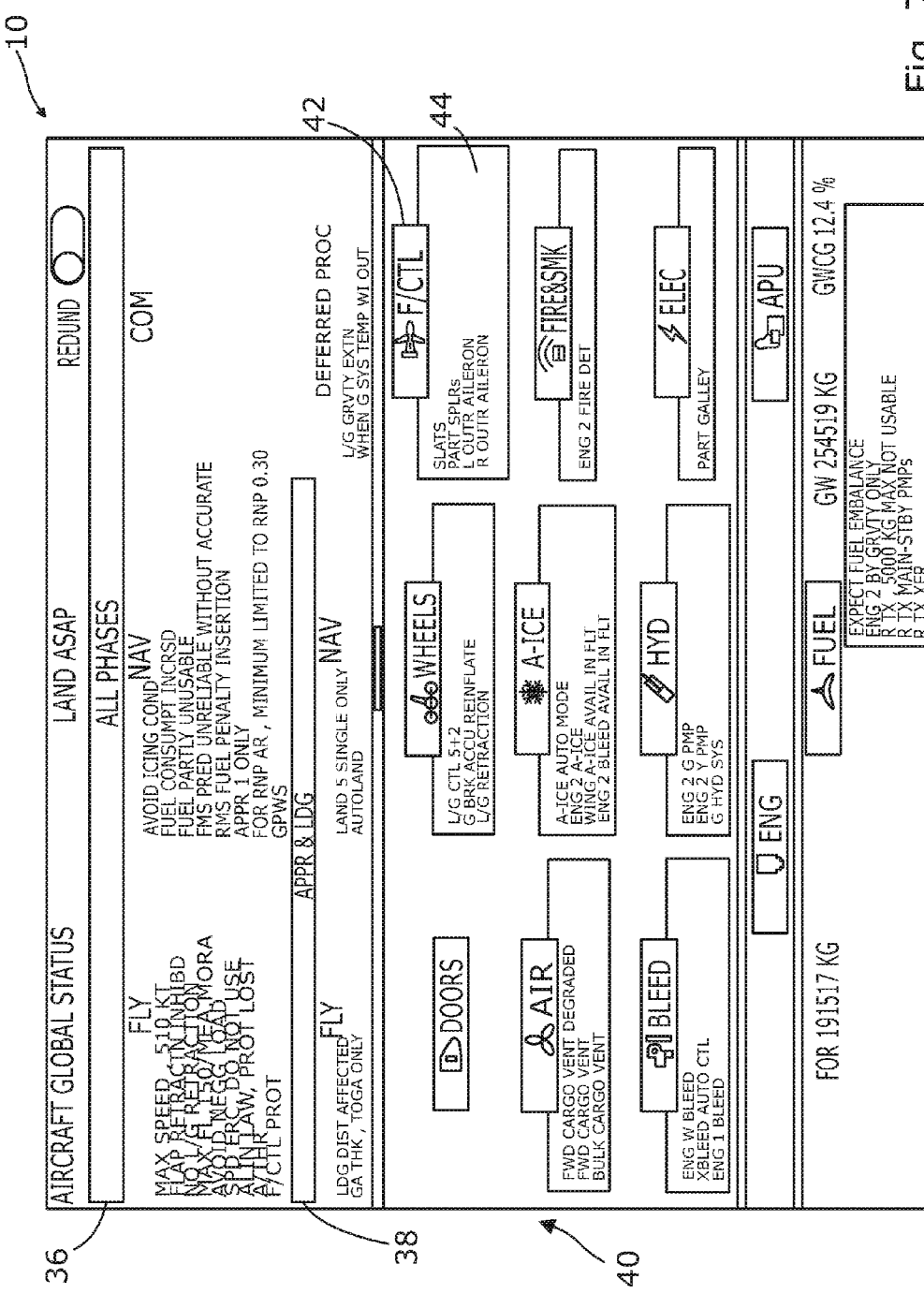
FIG. 7 illustrates an exemplary visualization of the tile system of FIG. 6 when expanded for displaying the subordinate messages.

Referring now to FIGS. 6A-6B and 7, it is preferred that the display module 30 utilizes a tile display system, generally designated 40, for illustrating the status messages in accordance with a technique disclosed in commonly assigned application Ser. No. 14/171,444 filed Feb. 3, 2014, which is incorporated by reference in its entirety.

As best shown in FIGS. 6A-6B, the tile display system 40 includes a toggle button 42 for selectively displaying a message tile 44 associated with the toggle button. In use, the toggle button 42 transitions between a closed state (FIG. 6A) and an open state (FIG. 6B) by selecting or clicking on the button using a dedicated input device, such as a finger tactile interaction device, a touch-sensitive screen, a digital pen and pad, a mouse, a trackball, and the like. A title of category (or subcategory) is displayed in the toggle button 42, and zero or more subordinate status messages associated with the category (or subcategory) are displayed in the message tile 44. Each status message informs the pilot and/or flight crew about potential degradation of the operational status of the aircraft.

As described above, the status messages can be displayed using the distinct color scheme based on the message type. For example, the status message displayed in green may indicate that the specific message refers to a particular operational status but not necessarily to degradation of the corresponding avionics component. However, the status message displayed in amber may indicate that the specific message leads to an inoperative function or avionics equipment in the aircraft.

Figure 8:
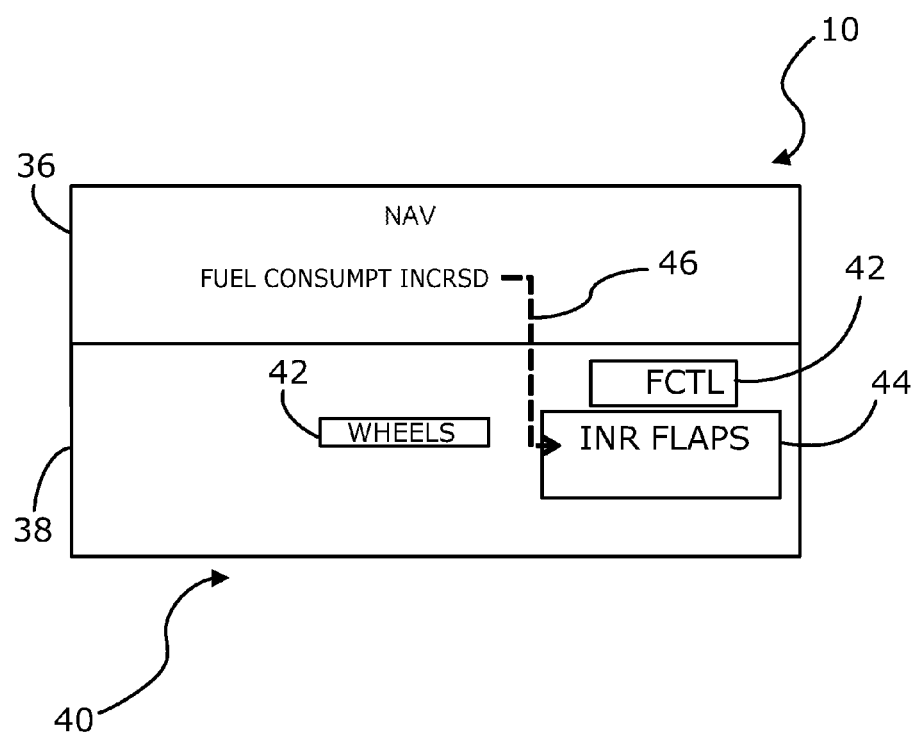
FIG. 8 illustrates an exemplary visualization of the tile system of FIG. 6, featuring a linkage established by the present diagnostic display system between the parent status message and the subordinate message.

Referring now to FIG. 8, it is contemplated that the display module 30 automatically detects an operational relationship between the status messages of the parent operational level 36 and the child functional level 38 based on the operational connection of the avionics components, and establishes a link or bond 46 between the status messages. The operational relationship may refer to a cause-and-effect connection between one or more avionics components of the aircraft.

As an example only, the pilot selects or clicks on one of the status messages, i.e., "FUEL CONSUMPT INCRSD," displayed in the parent operational level 36 using the input device. Next, the display module 30 detects the operational relationship and generates the link 46 between a first status message "FUEL CONSUMPT INCRSD" of the parent operational level 36 selected by the pilot and a second status message "INR FLAPS" is then displayed in the message tile 44 of the functional level 38. Optionally, at least one of the first and second status messages are highlighted for display.

The link 46 indicates the operational relationship between the first and second status messages, thereby immediately drawing attention of the pilot or flight crew to the potential degradation of corresponding avionics components. In this configuration, the pilot can readily determine which status messages require immediate attention for correction and recovery. By way of example shown in FIG. 8, the pilot understands that the fuel overconsumption is impacting or caused by the aircraft navigation, and this anomaly may be related to an operational failure or change in the configuration of the wing slats or flaps. The link 46 effectively and promptly provides a dedicated indication of an actual or potential cause or location of the trouble when the fault is detected by the diagnostic system 10. As a result, a prompt and efficient corrective course of action may be performed, and a reliable navigation may be provided while the aircraft is in operation. Although the message tile 44 is pointed with an arrow head of the link 46, the toggle button 42 can also be pointed when the button is in the closed state. Also, although an arrow is shown for the link 46, other suitable linkage types using a blinking pattern are contemplated as known in the art.

Figure 9:
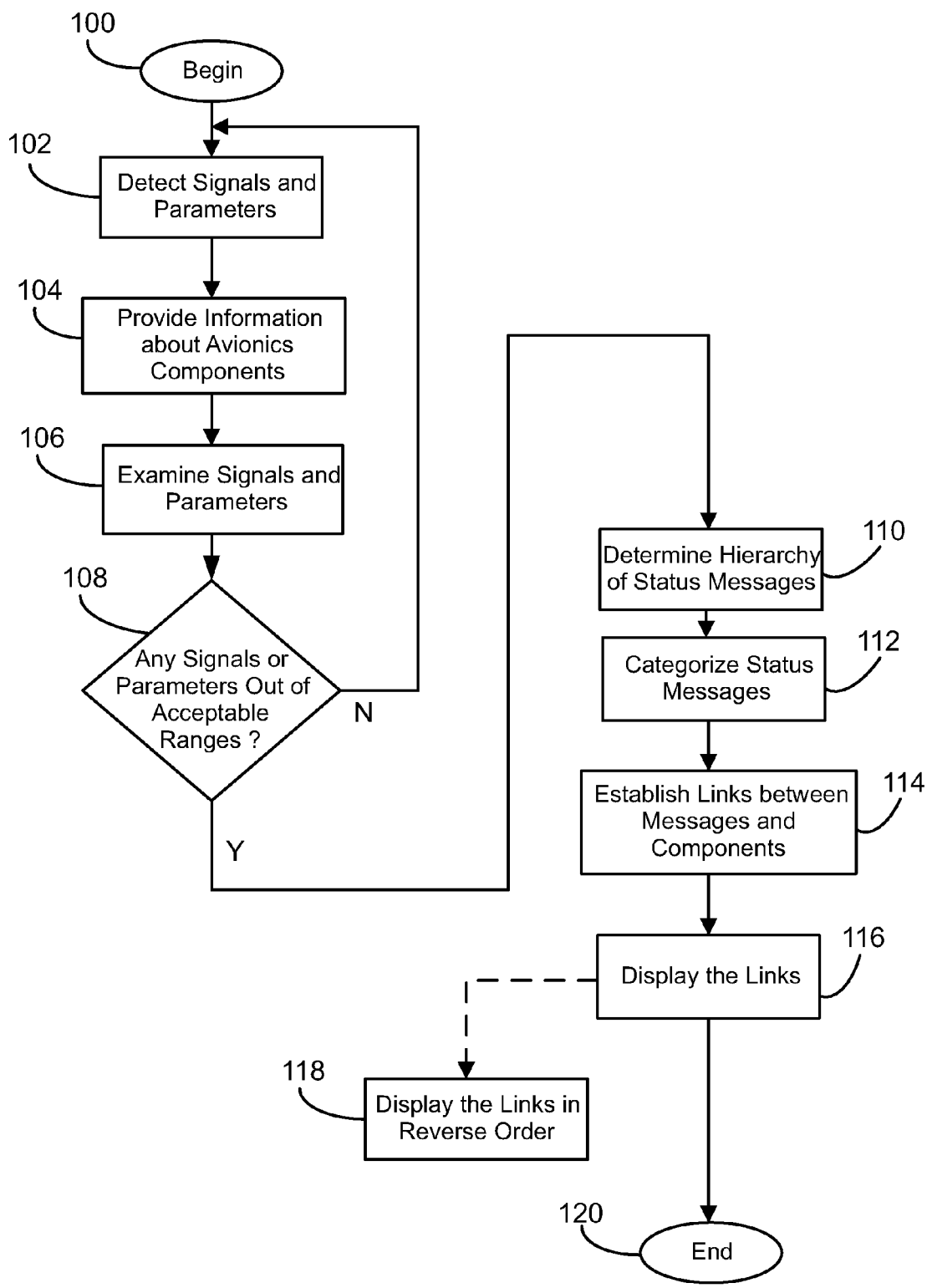
FIG. 9 is a flow chart of an exemplary method of executing the present diagnostic display system.

Referring now to FIG. 9, an exemplary diagnostic display method or process of executing the present system 10 is illustrated.

Although the following steps are primarily described with respect to the embodiments of FIGS. 1-8, it should be understood that the steps within the method may be modified and executed in a different order or sequence without altering the principles of the present invention.

The method begins at step 100. In step 102, the component information module 22 receives the signals from the sensors 14 and the parameters 16 from the avionics systems via the interface module 34. In step 104, the component information module 22 provides operational status information about at least one of the avionics components of the aircraft based on the received signals and parameters. As discussed above, the component information module 22 provides detailed operational status breakdowns or configurations of each avionics component using the status messages stored in the database 32.

In step 106, the detection module 24 receives the signals and parameters via the interface module 32, and examines the signals and parameters for detecting any faults or anomalies of the avionics components based on a predetermined set of rules. During operation, the detection module 24 monitors the operational status of the aircraft for a predetermined time period, and identifies the fault or anomaly of each avionics component based on the anomaly analysis in communication with the database 32.

In step 108, the diagnostics module 26 analyzes the detected faults or anomalies of the avionics components of the aircraft based on a set of predetermined thresholds or values. When at least one of the signals or parameters are out of acceptable ranges defined by the set of predetermined thresholds or values, control proceeds to step 110. Otherwise, control returns to step 102 and continues the diagnostic process.

In step 110, the categorization module 28 determines to which level each status message belongs based on a hierarchical level assigned to each status message. For example, the categorization module 28 classifies the status messages indicating the faults or anomalies into one of the operational level 36 and the functional level 38. In step 112, the categorization module 28 further divides the levels 36, 38 into one or more subcategories based on the operational connection of the avionics components.

In step 114, the display module 30 automatically detects an operational relationship between the status messages of the parent operational level 36 and the child functional level 38 based on the operational connection of the avionics components, and establishes a link or bond 46 between the status messages. In step 116, the display module 30 illustrates the link 46 defining a path or connection between the status messages displayed in the parent operational level 36 and the child functional level 38 when one of the status messages in the parent level is selected.

In step 118, in another alternative embodiment, the display module 30 illustrates the link 46 in a reverse order defining a path or connection between the status messages displayed in the parent operational level 36 and the child functional level 38 when one of the status messages in the child level is selected. The method ends at step 120 which could include a return to step 102.

While at least one exemplary embodiment of the present invention has been shown and described, it should be understood that modifications, substitutions and alternatives may be apparent to one of ordinary skill in the art and can be made without departing from the scope of the invention described herein. This application is intended to cover any adaptations or variations of the specific embodiments discussed herein. In addition, in this application, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

What is claimed is:

1. A diagnostic display system for diagnosing avionics components of an aircraft using an interactive display accessible to a user in real time, the system comprising:

a central diagnostic module configured for receiving at least one signal from a plurality of sensors for the aircraft, and at least one parameter from a related avionics system associated with the aircraft; and a component information module configured for providing operational status information about at least one of the avionics components of the aircraft, and providing a detailed operational status configuration of each avionics component using a plurality of status messages stored in a database via a network;

wherein the central diagnostic module assesses a current operational status of the aircraft by evaluating the operational status configuration illustrated in the display for establishing a visual link between the plurality of status messages associated with the avionics components of the aircraft.

2. The system of claim 1, further comprising an interface module configured for controlling operation of the plurality of sensors, the at least one parameter, the network, and other related system devices, services, and applications associated with the diagnostic display system.

3. The system of claim 1, further comprising a detection module configured for examining the at least one signal and parameter for detecting a fault of the avionics component based on a predetermined set of rules.

4. The system of claim 3, wherein the detection module monitors the operational status of the aircraft for a predetermined time period, and identifies the fault of the avionics component based on an anomaly analysis in communication with the database.

5. The system of claim 3, wherein the detection module retrieves at least a portion of diagnostic service data associated with the aircraft from the database for assisting in identifying the fault of a current operational status of the aircraft.

6. The system of claim 1, further comprising a diagnostics module configured for analyzing a detected fault of the avionics component of the aircraft based on a set of predetermined thresholds.

7. The system of claim 6, wherein the diagnostics module evaluates the detected fault by applying a set of predetermined queries in response to erroneous operation of at least one of the avionics components as represented by the at least one signal and parameter.

8. The system of claim 6, wherein when the diagnostics module determines that the detected fault is out of an acceptable range based on the predetermined thresholds, the plurality of status messages associated with the avionics components are selected for illustration on the interactive display.

9. The system of claim 1, further comprising a categorization module configured for categorizing the plurality of status messages based on a hierarchical level assigned to each status message.

10. The system of claim 9, wherein the categorization module divides the plurality of status messages into an operational level and a functional level.

11. The system of claim 10, wherein the categorization module further divides at least one of the operational and functional levels into one or more subcategories based on an operational connection of the avionics components.

12. The system of claim 10, wherein the operational level includes the plurality of status messages associated with at least one of a flight section, a navigation section, and a communication section.

13. The system of claim 10, wherein the functional level includes the plurality of status messages that are subordinate to the plurality of status messages of the corresponding operational level.

14. The system of claim 1, further comprising a display module configured for illustrating the plurality of status messages based on at least one of a hierarchical level assigned to each status message and an operational relationship between the avionics components of the aircraft.

15. The system of claim 1, further comprising a tile display system for illustrating the plurality of status messages, the tile display system including a toggle button for selectively displaying a message time associated with the toggle button.

16. A computer-implemented method for diagnosing avionics components of an aircraft using an interactive display accessible to a user in real time, the method comprising:
receiving at least one signal from a plurality of sensors for the aircraft, and at least one parameter from a related avionics system associated with the aircraft;
providing operational status information about at least one of the avionics components of the aircraft;
providing a detailed operational status configuration of each avionics component using a plurality of status messages stored in a database via a network;
assessing a current operational status of the aircraft by evaluating the operational status configuration illustrated in the display; and
establishing a visual link between the plurality of status messages associated with the avionics components of the aircraft.

17. The method of claim 16, further comprising examining the at least one signal and parameter for detecting a fault of the avionics component based on a predetermined set of rules.

18. The method of claim 16, further comprising analyzing a detected fault of the avionics component of the aircraft based on a set of predetermined thresholds.

19. The method of claim 16, further comprising categorizing the plurality of status messages based on a hierarchical level assigned to each status message.

20. The method of claim 16, further comprising illustrating the plurality of status messages based on at least one of a hierarchical level assigned to each status message and an operational relationship between the avionics components of the aircraft.

* * * * *